United States Patent [19]

Leo

[11] 4,075,153

[45] Feb. 21, 1978

[54] CORROSION-RESISTANT EPOXY-AMINE CHROMATE-CONTAINING PRIMERS

[75] Inventor: Angelo Frank Leo, Palatine Township, Cook County, Ill.

[73] Assignee: DeSoto, Inc., Des Plaines, Ill.

[21] Appl. No.: 728,714

[22] Filed: Oct. 1, 1976

[51] Int. Cl.$^2$ ............................................. C08L 63/02
[52] U.S. Cl. .................................. 260/37 EP; 106/14
[58] Field of Search .................. 260/37 EP, 33.2 EP, 260/33.6 EP; 106/14; 427/410; 428/416, 418; 252/389 R, 390

[56] References Cited

U.S. PATENT DOCUMENTS

| 3,505,269 | 4/1970 | Jeffery et al. | 260/37 EP X |
| 3,510,444 | 5/1970 | Vandenberg et al. | 260/37 EP |
| 3,532,653 | 10/1970 | Smeal | 260/37 EP X |
| 3,578,615 | 5/1971 | Moore et al. | 260/37 EP X |
| 3,598,616 | 8/1971 | Gibson et al. | 260/37 EP X |
| 3,829,395 | 8/1974 | Goodell | 260/37 EP X |

Primary Examiner—Lewis T. Jacobs
Attorney, Agent, or Firm—Dressler, Goldsmith, Clement, Gordon & Shore, Ltd.

[57] ABSTRACT

An improved corrosion-resistant two component epoxy-amine primer system is disclosed wherein the first component of the primer system includes a liquid solution of a resinous polyepoxide, such as a diglycidyl ether of bisphenol A, and the second component comprises a liquid solution of an epoxy curing agent carrying a plurality of amino hydrogen atoms. In accordance with the invention, at least one of the components, preferably the first, contains a finely divided siliceous material having OH groups, such as talc, clay, or hydrous silica prereacted with an alkoxy group of a polyalkoxy silane or siloxane carrying at least one active hydrogen atom from an amine or mercaptan group which is reactive with the epoxy group of the polyepoxide. In addition, at least one of the components contains one or more inorganic corrosion-resistant chromate pigments. The inclusion of the pretreated siliceous material improves the corrosion resistance of the epoxy-amine primer system because it links together the epoxy resin with the siliceous material to render the resulting primer more resistant to penetration by water or electrons which might otherwise form a corrosion cell.

21 Claims, No Drawings

CORROSION-RESISTANT EPOXY-AMINE CHROMATE-CONTAINING PRIMERS

The present invention relates to improving the corrosion resistance of epoxy-amine chromate-containing primers. p Epoxy-amine chromate-containing coatings are used in the aircraft industry as primers for paints. The primer provides an intermediate layer which forms a strong bond with the metallic surface, which is usually aluminum, and provides an outer surface to which topcoats will bond strongly. In addition to the adhesive securement of the topcoat, the primer also serves to resist corrosion of the underlying metal. This corrosion resistance includes not only the capacity to protect the metal surface which is covered by the primer, but also the capacity to extend the protection beyond the edge of the primer coating and prevent adjacent uncoated surfaces from corroding. Also, the primers of this invention exhibit an improved capacity to prevent filliform corrosion under a polyurethane based paint. Filiform corrosion is a corrosion which results in a worm-like appearance under a film of paint.

It has been unexpectedly discovered that epoxy-amine chromate-containing can be modified to provide improved corrosion resistance by incorporating into the primer a siliceous material which has been prereacted with a polyalkoxy silane or siloxane having at least one active hydrogen atom which is reactive with the epoxy group of a resinous polyepoxide. An alkoxy group of the polyalkoxy silane reacts with an OH group on the siliceous material to couple the two together. When the siliceous material which has been prereacted with the silane or siloxane is combined with a curable resinous polyepoxide, the active hydrogen atom on the silane or siloxane reacts with an epoxy group on the polyepoxide to interlink the polyepoxide and the siliceous material through the silane or siloxane. In the resulting primer, the presence of these interlinked groups is thought to prevent the development of corrosion cells by inhibiting the transport of water through the primer, and by creating a dielectric which inhibits the transport of electrons through the primer.

The two component epoxy-amine primer system of this invention includes a first component comprising a curable resinous polyepoxide in a liquid vehicle and a second liquid component comprising a solution of an epoxy curing agent carrying a plurality of amino hydrogen atoms, with at least one of the said components containing one or more inorganic corrosion-resistant chromate pigments. The prereacted siliceous material may be present in either component, although it is preferred to place it in the first component to insure the reaction of the active hydrogen atom on the polyalkoxy silane or siloxane with the epoxy group in the polyepoxide. The active hydrogen atom on the polyalkoxy silane or siloxane is provided either by an amine or by a mercaptan substituent, since the amine and mercaptan groups provide the active hydrogen atoms which are useful herein.

Primers prepared in accordance with this invention adhere well to cleaned aluminum and are curable at low temperature once the components are mixed and coated upon a substrate. The mixture has a usable life of several hours before the mixture becomes too viscous to apply.

In accordance with this invention, a corrosion-resistant two component epoxy-amine chromate-containing primer system is provided including a finely divided siliceous material which has been pretreated with a polyalkoxy silane or siloxane having at least one active hydrogen atom provided by an amine or mercaptan substituent. The pretreatment is a prereaction between OH groups on the siliceous material and alkoxy groups on the silane or siloxane, this reaction releasing alcohol. From 0.3 to 3 parts by weight of pretreated siliceous material per part of polyepoxide should be used, preferably from 0.5 - 2 parts, and most preferably about 0.8 - 1.2 parts.

Typical of the resinous polyepoxides which may be used in this invention are diglycidyl ethers of bisphenol A, diglycidyl ethers of bisphenol F, the glycidyl ethers of glycerol, epoxylated novolaks, and the like. These are usually provide by the reaction of epichlorohydrin with a polyhydric organic compound which is normally a polyhydroxy phenol, e.g., bisphenol A, bisphenol F, trihydroxy diphenyl dimethyl methane, 4,4'-dihydroxy biphenyl and the like. Other polyhydric organic compounds are also useful, e.g., ethylene glycol, 2,3-butane diol, erythritol, glycerol, and the like. The above noted resinous polyepoxides, also known as epoxy resins, can be cured by reaction of the epoxide groups therein with amines which contain a plurality of amino hydrogen atoms, as will be discussed hereinafter.

These epoxy resins can be used in substantially unmodified form in the two-component system of this invention. However, it is preferred, as taught in U.S. Pat. No. 3,660,523, to react a resinous polyepoxide possessing epoxy and hydroxy functionalities with an isocyanate-terminated polyurethane. The disclosure of Pat. No. 3,660,523 is incorporated herein by reference.

The curing reaction between a polyepoxide and an amine containing a plurality of amino hydrogen atoms is itself well known, and numerous amines are available for this purpose. Since cure at room temperature is preferred, aliphatic amines containing the primary amine group are preferred. Such amines are illustrated by diethylene triamine and triethylene tetramine. Polyalkoxysubstituted silane-based primary amines are particularly preferred since they improve adhesion to the aluminum base, as is known. These are illustrated by aminopropyl trimethoxy silane. Aromatic amines, such as methylene dianiline, can be used, but these need elevated temperature, e.g., about 250° F., to assist the cure.

The above curing reaction is assisted by the presence of a tertiary amine, e.g., tris-(dimethylaminomethyl)-phenol, which acts as a catalyst.

The two component epoxy-amine coating system includes a corrosion-resistant amount of an inorganic finely divided chromate pigment which may be present in either component and is preferably included in the epoxy resin component. Preferably the chromate-containing pigment is present in an amount of at least 0.05 part by weight of chromate pigment per part of the epoxy resin. More preferably, the chromate pigment is present in a ratio of from about 0.2 part by weight to about 0.8 part by weight per part of the epoxy resin. Suitable corrosion-resistant chromate pigments which may be used in epoxy-amine primer systems are well known in the art, and include calcium chromate, strontium chromate, lead chromate, zinc chromate, magnesium chromate, and barium chromate, these being useful alone or in admixture with one another.

The essence of this invention lies in the inclusion in the coating system of the invention of a finely divided siliceous material having OH groups prereacted with an alkoxy group of a polyalkoxy silane or siloxane carrying at least one active hydrogen atom provided by an amine or mercaptan substituent. The finely divided siliceous material is preferably clay, talc, or hydrous silica. Clay is a hydrated aluminum silicate, and talc is a hydrated magnesium silicate. Of the different varieties of clay which are available kaolin clay has proven to be the most suitable. The finely divided siliceous material should be uniformly dispersed throughout the coating system, and the finer the particle size, the better this can be done. An average particle diameter of less than about one micron is usually desirable, and more preferably the average particle diameter is less than 0.5 microns. An average particle diameter in the range of about 0.2 to 0.4 microns will illustrate preferred practice wherein about 0.1 percent of the powder used is retained on a 325 mesh screen.

The finely divided siliceous material having OH groups is pretreated with the polyalkoxy silane or siloxane. It has been found that mercaptan-substituted polyalkoxy silanes and aminesubstituted polyalkoxy silanes are suitable for the purposes of this invention as both the amine and mercaptan substituents provide active hydrogen atoms which will readily react at room temperature with the epoxy groups of a resinous polyepoxide.

The preferred amine or mercaptan-substituted polyalkoxy silanes or siloxanes which are useful in this invention may be characterized by the following formula:

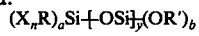

where X is selected from —NH$_2$, —NHR″, and —SH, n is an integer from 1 to 5, normally 1, R is a hydrocarbon group containing from 1 to 22 carbon atoms, preferably an alkyl group containing from 2 to 8 carbon atoms, R′ is an alkyl group containing from 1 to 8 carbon atoms, preferably 1 or 2, a is at least 1, y is from 0–20, preferably 0–5, and b is at least 2. R″ is an alkyl group containing from 1 to 4 carbon atoms.

When y is 0, the compound is a silane and "a" and "b" will total to 4 to complete the four bonds on the silicon atom. When y is 1 or more, the compound is a siloxane. When the valences of the silicon atoms or atoms present in the compound are not fully satisfied in the above formula, any unsatified valence is satisfied by hydrocarbon groups containing from 1 to 22 carbon atoms, most usually methyl or phenyl.

The above compounds are illustrated by aminopropyl trimethoxy silane which has the formula:

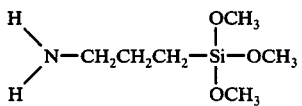

The use of a secondary amine group would be illustrated by the same compound in which one of the amino hydrogen groups is replaced by a methyl group. On the other hand, the amine group can be replaced by the mercaptan group.

Instead of using an amine or mercaptan-substituted polyalkoxy silane, the corresponding polyalkoxy siloxanes can be used. As is known, hydrolysis of the starting chlorosilanes, from which the alkoxy siloxanes are produced, yields siloxanes, and these after introduction of the alkoxy and amine or mercaptan substituents, can also be used.

Without being limited to theory, it is thought that when the finely divided siliceous material having OH groups is pretreated with a polyalkoxy silane or siloxane carrying an active hydrogen atoms as defined, the alkoxy group of the silane or siloxane reacts with the OH group of the siliceous material without consuming the active hydrogen atom, thus leaving it free to react with an epoxy group. When this treated siliceous material is added to the epoxy-amine resin system, the active hydrogen reacts with the epoxy resin, thus forming a link between the epoxy resin and the clay, talc or other siliceous material. This serves to create a dielectric which prevents the transfer of electrons through the film and also functions as a more effective barrier against the transfer of water, thereby inhibiting the creation of a degenerative corrosion cell.

The desired treated siliceous material is obtained by reacting a siliceous material having OH groups, such as kaolin clay, talc, or a hydrous silica, with a small amount of the described polyalkoxy silane or siloxane. The amount of the polyalkoxy silane may vary over a wide range of from about 0.1 percent to about 10 percent by weight with 0.5 percent to 5 percent being preferred and 1 percent to 3 percent being most preferred, based on the weight of the siliceous material. The siliceous material is contacted with the polyalkoxy silane under conditions, such as moderate heat, sufficient to react the alkoxy group of the polyalkoxy silane with the siliceous material. The by-product is an alcohol which vaporizes away. Alternatively, ready made pretreated clay and talc may be purchased under the trade name Nulok (amino silane treated clay), or Nucap (mercapto silane treated clay) from J. M. Huber Corporation — Clay Division— Huber, Georgia., or Novakup from Malvern Minerals Company, Hot Springs, Arkansas.

Although the treated siliceous material may be included in either component of two component system, it is preferred to include it in the epoxy resin-containing component to insure coreaction between the two. In this manner, it is postulated that the active hydrogen groups which remain in the treated siliceous material react with the epoxy resin before the two components of the primer are mixed together. The treated siliceous material thus completes the epoxy-siliceous material link when it is combined with the epoxy containing component, and this may be before or after (preferably before) the amine curing agent-containing component is brought into the picture.

In a preferred embodiment of this invention, the epoxy-containing component (alternately referred to herein as the first component) includes a diglycidyl ether of a bisphenol as the resinous polyepoxide with an average molecular weight of about 350 to 6000, with a weight of about 500–3000 being preferred. The term "a bisphenol" denotes a pair of phenolic groups joined by an alkylene group. Also included is at least one inorganic corrosion-resistant chromate pigment in a ratio of from about 0.1 to about 1 part by weight per part of epoxy resin, with a range of 0.2 to 0.8 part by weight of the chromate pigment being preferred. In the practice of the invention combinations of pigment, such as strontium chromate and lead chromate, may be used. Suitable pigments and combinations thereof are well known to those skilled in the art. The balance of the first component may contain an opacifying pigment, such as titanium dioxide, and any of the well known inert solvents which can be generally described as those lacking active hydrogen atoms reactive with epoxy resin under the conditions which are contemplated.

Appropriate inert solvents include, for example, toluene, xylene, and methyl ethyl ketone, or any of the well known ether solvents, such as dimethoxyethane. Even isopropanol can be used since it is inert under the room temperature conditions contemplated, though it would be reactive at elevated temperature if the system were appropriately catalyzed.

The proportions of these additional agents, such as pigments and solvents, are not critical within reasonable limitations and will be apparent to those skilled in the art. As an example, the first component may contain from about 0.02 to about 0.2 parts by weight of titanium dioxide per part of epoxy resin. A suitable solvent mixture may include, for example, methyl ethyl ketone in a range of about 1 to 1.8 parts by weight per part by weight of epoxy resin, and 2-ethoxy ethanol acetate in the range of about 0.4 to about 0.8 parts by weight per part of epoxy resin.

The preferred embodiment of the second component which contains the epoxy curing agent which contains a plurality of amino hydrogen atoms also includes a tertiary amine catalyst, such as tris-(dimethylaminomethyl)-phenol. Preferably, the amount of tris-(dimethylaminomethyl)-phenol is in the range of about 0.04 to 0.08 part by weight per part of epoxy resin. The preferred curing agent is N-beta-(aminoethyl)-gamma-aminopropyl trimethoxy silane, and is used since it improves the adhesion of the primer to the substrate being coated, preferably in an amount in the range of about 0.02 to 0.16 part by weight per part of epoxy resin. The various agents in the second component are dissolved in inert solvents, as previously described. As is the case with the first component, the proportions of solvent or any additional agents is not critical and should be readily apparent to those skilled in the art. A proportion of isopropanol, preferably in the range of about 1 to 2 parts by weight per part of epoxy resin, is desirably present in the second component.

It is stressed that the two component primer system used herein is not new except for the incorporation of the siliceous material which has been prereacted with the polyalkoxy silane or siloxane which carries the amine or mercaptan substituent.

In the practice of the invention, the two components are thoroughly admixed, preferably in approximately equivolume amounts in accordance with the proportions disclosed above. The aluminum surface is prepared by cleaning the same with an acid etch, oxidizing acids such as chromic acids being particularly preferred. The cleaned surface is then coated with the mixture and the coating is cured at low temperature (room temperature to about 250° F.). Baking at 250° F. provides a cure in less than about 1 hour, though lower temperatures are preferred. Importantly, a room temmperature cure can be used if enough time is employed, e.g., 1 week, and this is a feature of this invention.

The following will serve to illustrate the invention, it being understood that all proportions herein are by weight unless otherwise stated:

EXAMPLE

First Component

Parts

| | |
|---|---|
| 250 | diglycidyl ether of bisphenol A (average molecular weight about 1000) |
| 100 | strontium chromate |
| 250 | mercaptosilane-treated clay (see note 1) |
| 50 | lead chromate |
| 25 | titanium dioxide |
| 350 | methyl ethyl ketone |
| 125 | 2-ethoxy ethanol acetate |

Second Component

Parts

| | |
|---|---|
| 16 | tris-(dimethylaminomethyl)-phenol |
| 27 | N-beta-(aminoethyl)-gamma-aminopropyl trimethoxy silane |
| 132 | toluene |
| 89 | xylene |
| 327 | isopropanol |
| 116 | methyl ethyl ketone |

Note 1: The mercaptosilane-treated clay in the first component is kaolin clay treated with about 1.5 percent of mercaptosilane. The clay is of medium particle diameter averaging about 0.3 micron with 0.1 percent being retained on a 325 mesh screen. The mercaptosilane is gamma-mercaptopropyltimethoxy silane. The commercially available Nucap 290 (J. M. Huber Corporation) may be used. In place of the tris-(dimethylaminomethyl)-phenol, the commercially available product DMP-30 (Rohm & Haas, Philadelphia, Pennsylvania) may be used.

The first and second components are combined on an equivolume basis to provide a mixture having an initial viscosity of about 17 seconds measured in a #2 Zahn cup. This mixture is treated by spray application on aluminum panels to deposit coatings having a thickness in the range of 0.5–0.7 mil. The coatings were dried in air under ambient conditions for 7 days at which time they were treated and exhibited excellent performance using 5% salt spray (ASTM B-117-64) and acetic acid salt spray (5% salt with acetic acid added to pH 3.0-3.3 per ASTM B-287-62). The presence of the treated clay greatly improves the corrosion resistance.

As an important variation to the preferred practice illustrated in this Example, the mercaptosilane-treated clay is replaced by an aminosilane-treated silica (L-207A Novakup 6050 supplied by Malvern Minerals Company). This product is a siloxane derivative.

It is desired to point out that resistance to filiform corrosion is best using the mercaptosilane-treated clay. On the other hand, when one attempts to maximize the capacity of the primed surface to resist corrosion beyond the coated edge, then the aminosilane-treated silica provides the best performance.

The invention is defined in the claims which follow.

I claim:

1. A corrosion-resistant two component epoxy-amine primer system comprising a mixture of two components, said first component comprising a resinous polyepoxide having an average molecular weight in the range of about 350 to 6000 in a liquid vehicle and said second component comprising a solution of an epoxy curing agent carrying a plurality of amino hydrogen atoms, at least one inorganic corrosion-resistant chromate pigment present in at least one of said components, and at least one of said components containing a finely divided siliceous material carrying OH groups prereacted with the alkoxy group of a polyalkoxy silane or siloxane carrying at least one active hydrogen atom on an amine or mercaptan substituent.

2. The system of claim 1 wherein the finely divided siliceous material is selected from the group consisting of talc, clay and hydrous silica.

3. The system of claim 2 wherein the finely divided siliceous material is talc.

4. The system of claim 2 wherein the finely divided siliceous material is clay.

5. The system of claim 2 wherein the finely divided siliceous material is hydrous silica.

6. The system of claim 1 wherein said prereacted siliceous material is present in an amount of from 0.3 to 3 parts by weight per part of said polyepoxide and the finely divided siliceous material is reacted with from about 0.1 to about 10% by weight of said polyalkoxy silane or siloxane.

7. The system of claim 6 wherein said prereacted siliceous material has an average particle diameter of less than about one micron.

8. The system of claim 1 wherein the polyalkoxy silane or siloxane having at least one active hydrogen atom is represented by the formula:

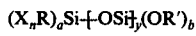

where X is selected from —NH$_2$, —NHR", and —SH, $n$ is an integer from 1 to 5, R is a hydrocarbon group containing from 1 to 22 carbon atoms, R' is an alkyl group containing from 1 to 8 carbon atoms, a is at least 1, y is from 0–20, b is at least 2, R" is an alkyl group containing from 1 to 4 carbon atoms, and any unsatisfied valence in the formula is satisfied by hydrocarbon groups containing from 1 to 22 carbon atoms.

9. The system of claim 8 wherein R' is methyl, R is an alkyl group of 2 to 8 carbon atoms, a and n are 1, y is from 0–5 and b is 3.

10. The system of claim 1 wherein the polyepoxide is a diglycidyl ether of a bisphenol having an average molecular weight of about 500 to 3000.

11. The system of claim 10 wherein said polyepoxide is reacted with less than about ten percent by weight thereof of an organic polyisocyanate.

12. The system of claim 1 wherein a tertiary amine catalyst is present with said epoxy curing agent.

13. The system of claim 12 wherein the epoxy curing agent includes an amine-substituted polyalkoxy silane present in an amount of about 0.02 to 0.16 part of the amine per part of polyepoxide.

14. The system of claim 12 wherein said tertiary amine is tris-(dimethylaminomethyl)-phenol.

15. The system of claim 6 wherein said prereacted siliceous material is included in the component containing the resinous polyepoxide.

16. A corrosion-resistant two component epoxy-amine primer system comprising a mixture of two components, said first component comprising a resinous polyepoxide which is a diglycidyl ether of a bisphenol, said polyepoxide having an average molecular weight in the range of about 350 to 6000 and being dissolved in inert organic solvent and having dispersed therein corrosion resistant chromate pigment and from 0.3 to 3 parts per part of polyepoxide of finely divided siliceous material selected from clay, talc and hydrous silica prereacted with about 0.1 to about 10% by weight of a polyalkoxy silane or siloxane carrying an alkyl group having an active hydrogen atom substituent thereon selected from primary amine, secondary amine, or mercaptan, and said second component comprising an amine curing agent for said polyepoxide carrying a plurality of amino hydrogen atoms in an amount of about 0.02 to 0.16 part of the amine per part of polyepoxide and a tertiary amine catalyst dissolved in inert organic solvent.

17. The system of claim 16 wherein said chromate pigment is used in an amount of from 0.1–1 part thereof per part of polyepoxide, and said siliceous material is reacted with from 0.5% to 5% of said silane or siloxane.

18. An improved corrosion-resistant epoxy-amine primer coating comprising the reaction product of a resinous polyepoxide and an epoxy curing agent carrying a plurality of amino hydrogen atoms, an inorganic corrosion-resistant chromate pigment and a finely divided siliceous material prereacted with from about 0.1% to about 10% by weight of a polyalkoxy silane or siloxane carrying at least one active hydrogen atom on an amine or mercaptan substituent.

19. The primer of claim 18 wherein the siliceous material is selected from the group consisting of talc, clay and hydrous silica.

20. A method of priming an aluminum surface comprising, applying to the aluminum surface a coating composition comprising, in an organic solvent medium, a resinous polyepoxide, a curing agent therefor having a plurality of amino hydrogen atoms, a tertiary amine catalyst, corrosion-resistant chromate pigment and the reaction product of a finely divided siliceous material carrying OH groups and a polyalkoxy silane or siloxane carrying at least one active hydrogen atom on an amine or mercaptan substituent, and curing the applied primer at a temperature not in excess of about 250° F.

21. A method as recited in claim 20 wherein said coating is cured at about room temperature.

* * * * *